United States Patent [19]
Nash et al.

[11] Patent Number: 5,197,694
[45] Date of Patent: * Mar. 30, 1993

[54] OVERWING THRUST REVERSER

[75] Inventors: Dudley O. Nash, Cincinnati; Donald F. Keck, Fairfield, both of Ohio

[73] Assignee: General Electric Company, Cincinnati, Ohio

[*] Notice: The portion of the term of this patent subsequent to Oct. 22, 2008 has been disclaimed.

[21] Appl. No.: 516,015

[22] Filed: Apr. 27, 1990

[51] Int. Cl.[5] .............................................. B64D 33/04
[52] U.S. Cl. ........................... 244/110 B; 239/265.29; 239/265.37
[58] Field of Search ................ 244/110 B, 23 D, 12.5; 239/265.29, 265.37, 265.33, 265.27, 265.25; 60/226.2

[56] References Cited
U.S. PATENT DOCUMENTS

| | | | |
|---|---|---|---|
| 3,856,239 | 12/1974 | Leibach | 244/12.5 |
| 3,863,867 | 2/1975 | Souslin et al. | 244/12 D |
| 3,874,620 | 4/1975 | Kahler et al. | 244/110 B |
| 3,877,663 | 4/1975 | Curran et al. | 244/110 B |
| 3,907,224 | 9/1975 | Stearns | 244/110 B |
| 3,915,415 | 10/1975 | Pazmany | 244/110 B |
| 3,917,198 | 11/1975 | Sanders | 244/110 B |
| 3,936,017 | 2/1976 | Blythe et al. | 244/110 B |
| 3,981,463 | 9/1976 | Pazmany | 244/110 B |
| 4,030,687 | 6/1977 | Hapke | 244/12.5 |
| 4,093,122 | 6/1978 | Linderman et al. | 239/265.37 |
| 4,183,478 | 1/1980 | Rudolph | 224/110 B |
| 5,058,828 | 10/1991 | Pillari | 244/110 B |

Primary Examiner—Joseph F. Peters, Jr.
Assistant Examiner—Anne E. Bidwell
Attorney, Agent, or Firm—Jerome C. Squillaro; James P. Davidson

[57] ABSTRACT

A thrust reverser assembly is disclosed for a wing mounted gas turbine engine exhaust nozzle having an outlet for discharging exhaust gases over a surface of the wing. The assembly in accordance with a preferred embodiment includes a deflector having forward and aft ends, and first and second sides joined together by a base. The deflector is positionable in a stowed position around the exhaust nozzle so that the aft end is aligned generally with the nozzle outlet for allowing substantially unobstructed discharge of exhaust gases therefrom, and in a deployed position for changing direction of exhaust gases for thrust reversal. A pair of bellcranks are positioned adjacent to respective ones of the deflector sides and actuators are povided for rotating the bellcranks for moving the deflector between the stowed and deployed positions. A pair of elongate tracks having rollers slidably positioned therein and being pivotally connected to the deflector are also provided for controlling the angular orienation of the deflector so that the deflector aft end is disposed against the wing surface and the base extends outwardly from the wing surface for deflecting exhaust gases upwardly and out the deflector forward end when the deflector is in the deployed position.

25 Claims, 4 Drawing Sheets

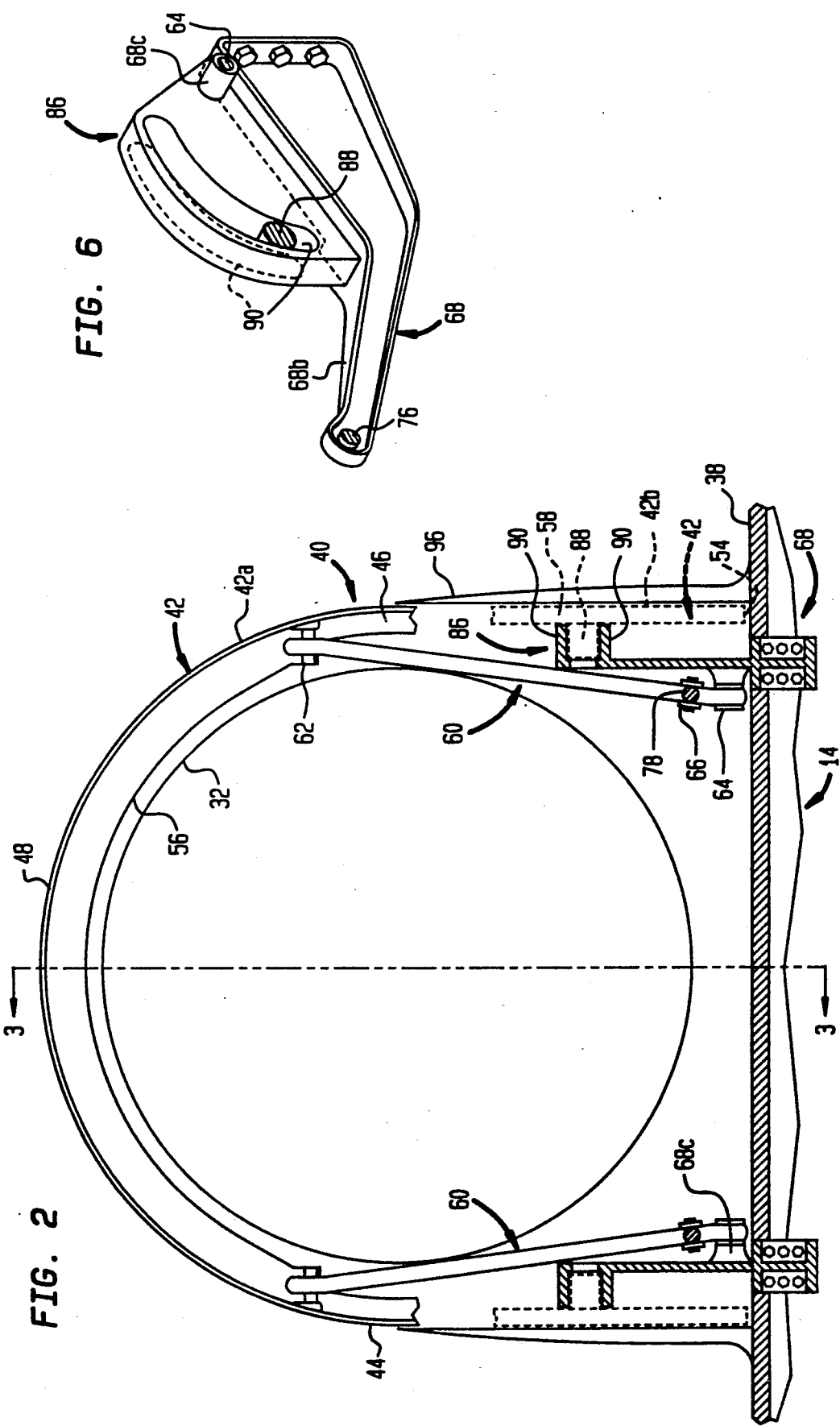

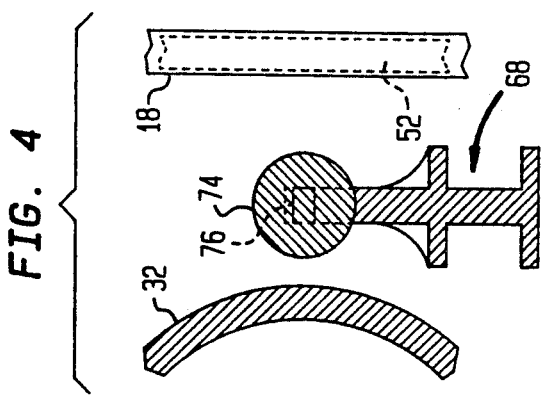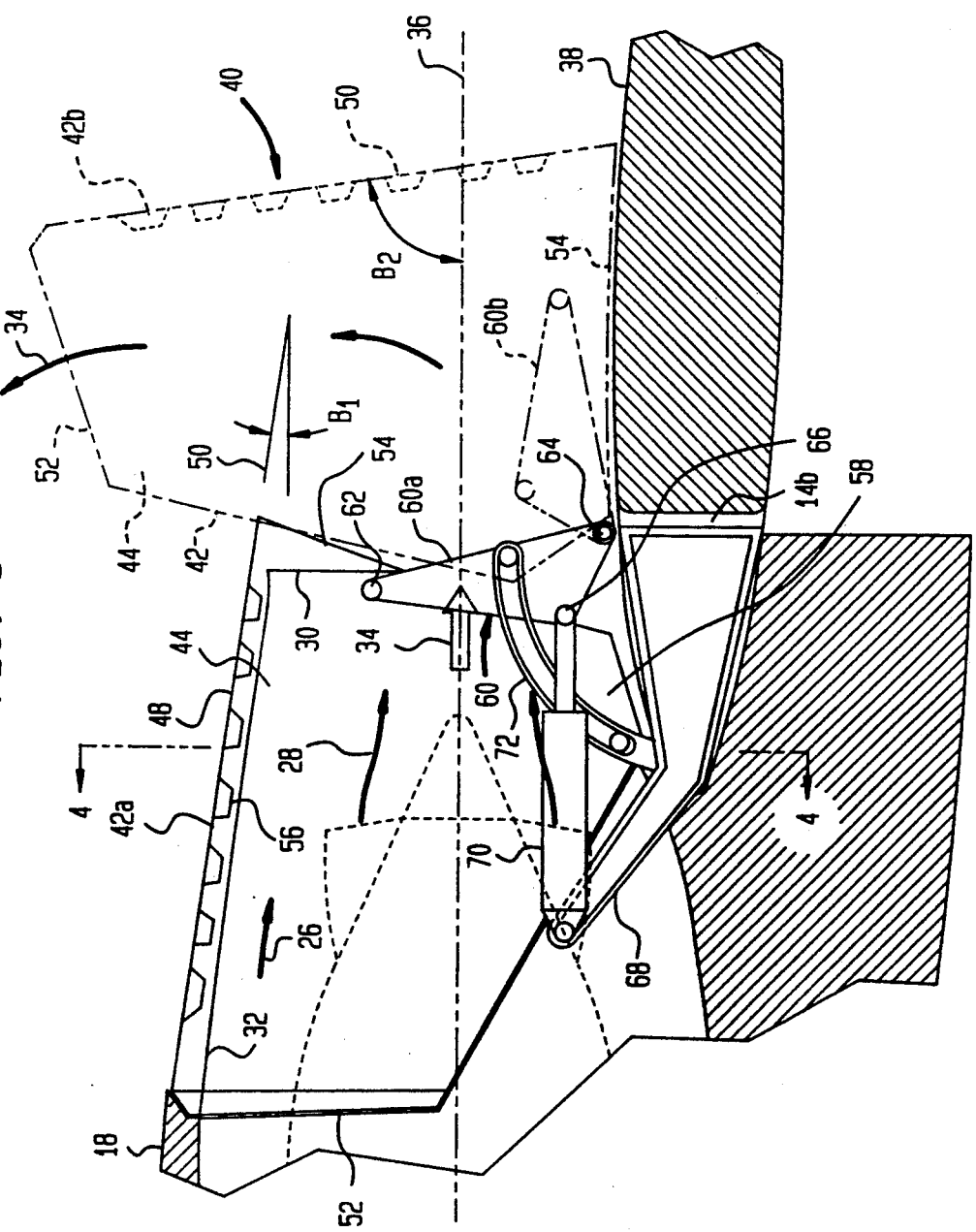

OVERWING THRUST REVERSER

TECHNICAL FIELD

The present invention relates generally to thrust reverser assemblies for aircraft gas turbine engines, and, more specifically, to a thrust reverser assembly for an over-the-wing gas turbine engine including an exhaust nozzle.

BACKGROUND ART

Conventional thrust reversers for aircraft gas turbine engines are provided for deflecting exhaust gases discharged from the engine in a generally forward direction upon landing of an aircraft for assisting in braking the aircraft. The thrust reverser is typically designed to translate from a stowed position, wherein it is aerodynamically blended with a conventional nacelle surrounding the engine, to a deployed position spaced rearwardly of the engine exhaust nozzle such that the exhaust gases are turned forwardly while avoiding back pressure in the exhaust gases which would affect performance of the engine.

Thrust reversers for underwing or fuselage mounted engines typically include a pair of symmetrical deflector doors, or deflectors, for providing thrust reversal. In an overwing mounted gas turbine engine, conventional thrust reversers are typically unsymmetrical and must function within a relatively confined area between the engine and the wing. There are several types of conventional overwing thrust reversers which utilize one or more deflectors and various actuators and linkages for positioning the deflectors between stowed and deployed positions. The required travel of the deflector between the stowed and deployed position is relatively large, thus requiring suitable actuators and linkages. Exemplary conventional actuators typically generate relatively large actuation forces and have relatively long strokes. Furthermore, the actuators may be disposed within the wing itself instead of adjacent to the exhaust nozzle and surrounding nacelle. This is generally undesirable since the degree of serviceability of the thrust reverser is relatively low in such embodiments.

Furthermore, in operation, the thrust reverser is typically deployed when an aircraft is landing and is rolling at relatively high speed. Therefore, it is subject to relatively high air velocity passing over the engine and wing which generates substantial aerodynamic pressure forces on the deflector which must be suitably accommodated for minimizing or preventing buffeting of the deflector during deployment. The forces due to the airflow over the engine during landing are in addition to the forces generated by the exhaust gases discharged from the engine exhaust nozzle against the deflector for thrust reversal, which must also be accommodated by the linkages attaching the deflector to the engine, nacelle, and/or wing.

OBJECTS OF THE INVENTION

Accordingly, one object of the present invention is to provide a new and improved thrust reverser assembly for an aircraft mounted gas turbine engine.

Another object of the present invention is to provide a thrust reverser assembly for an overwing gas turbine engine.

Another object of the present invention is to provide a thrust reverser assembly which is relatively compact and lightweight.

Another object of the present invention is to provide a thrust reverser assembly utilizing a single deflector for obtaining thrust reversal.

Another object of the present invention is to provide a thrust reverser assembly having relatively small actuators with relatively short strokes and relatively small actuation force for providing relatively large translation of a deflector from a stowed to deployed position.

Another object of the present invention is to provide a thrust reverser assembly wherein the actuation means are disposed primarily adjacent to the exhaust nozzle for improving serviceability.

Another object of the present invention is to provide a thrust reverser assembly having a relatively compact actuation means which is effective for providing stable deployment of the deflector for accommodating aerodynamic pressure forces due to airflow and exhaust gases against the deflector during operation.

DISCLOSURE OF INVENTION

A thrust reverser assembly is disclosed for a gas turbine engine and exhaust nozzle, supported by an aircraft wing, having an outlet for discharging exhaust gases over a surface of the wing. The assembly in accordance with a preferred embodiment includes a deflector having forward and aft ends, and first and second sides joined together by a base. The deflector is positionable in a stowed position around the exhaust nozzle so that the aft end is aligned generally with the nozzle outlet for allowing substantially unobstructed discharge of exhaust gases therefrom, and in a deployed position for changing direction of exhaust gases for thrust reversal. A pair of bellcranks are positioned adjacent to respective ones of the deflector sides and means are provided for rotating the bellcranks for moving the deflector between the stowed and deployed positions. Positioning means are also provided for controlling the angular orientation of the deflector so that the deflector aft end is disposed against the wing surface and the base extends outwardly from the wing surface for deflecting exhaust gases upwardly and out from the deflector forward end when the deflector is in the deployed position.

BRIEF DESCRIPTION OF DRAWINGS

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawing in which:

FIG. 2 is a transverse sectional view, partly schematic, taken through the thrust reverser assembly illustrated in FIG. 1 along line 2—2.

FIG. 3 is an enlarged sectional view of the thrust reverser assembly illustrated in FIG. 1.

FIG. 4 is a transverse sectional view of a portion of the thrust reverser assembly illustrated in FIG. 3 taken along line 4—4.

FIG. 6 is a perspective view of the support plate illustrated in FIG. 5 shown in more detail.

MODE(S) FOR CARRYING OUT THE INVENTION

Figure 1:
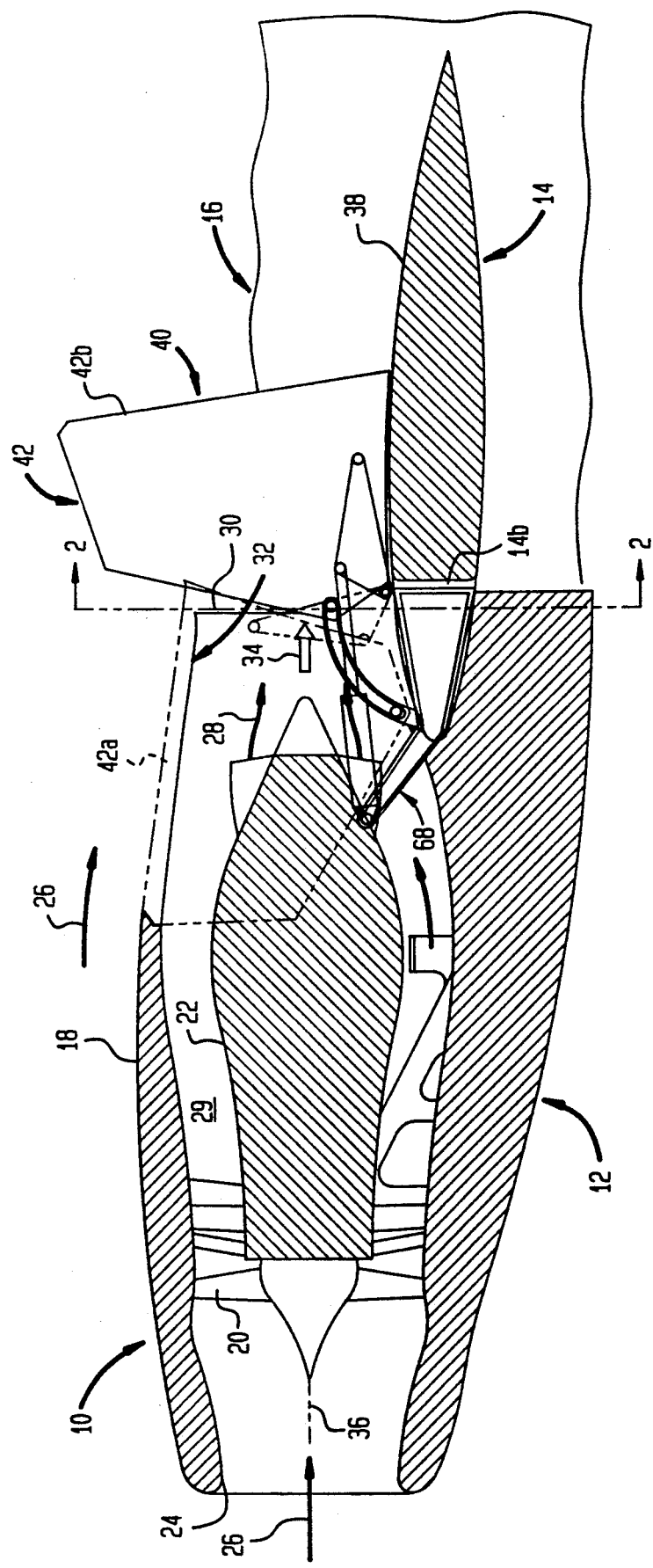
FIG. 1 is a centerline sectional view, partly schematic, of an exemplary turbofan gas turbine engine mounted over an aircraft wing and including a thrust reverser assembly in accordance with one embodiment of the present invention.

Illustrated in FIG. 1 is an exemplary turbofan gas turbine engine 10 conventionally mounted by a pylon 12 over and partly forward of a wing 14 extending from an aircraft 16, only a portion of which is shown. The engine 10 is surrounded by a conventional nacelle 18 and includes a conventional fan 20 and core engine 22 therein. The engine 10 also includes an inlet 24 for receiving ambient air 26 which is channeled through the fan 20 and the core engine 22, wherein it is compressed and burned with fuel for generating combustion gases 28. A conventional bypass duct 29 surrounds the core engine 22 and channels a portion of the inlet air 26 which is mixed with the combustion gases 28 and discharged through a conventional outlet 30 of an exhaust nozzle 32 as exhaust gases 34.

The engine 10 and exhaust nozzle 32 have a common axial centerline axis 36 extending therethrough which is disposed generally parallel to the wing 14 and an outer surface 38 thereof. During conventional operation of the engine 10 the exhaust gases 34 are channeled parallel to the centerline axis 36 through the exhaust nozzle 32 and rearwardly from the outlet 30 over the wing outer surface 38.

When the aircraft 16 is landing, reversal of the exhaust gases 34 is obtained by a thrust reverser assembly 40 in accordance with a preferred embodiment of the present invention. FIGS. 2 and 3 illustrate in more particularity the assembly 40. The assembly 40 includes a generally U-shaped single deflector 42 having first and second transversely spaced apart generally flat sides 44 and 46, respectively. In FIGS. 1 and 2, the deflector 42 is shown in dashed line, designated 42a, in its stowed position around the exhaust nozzle 32 and aerodynamically blended with the nacelle 18. It is shown in solid lines, designated 42b, in its deployed position for obtaining thrust reversal. In FIG. 3, the solid and dashed line representations of the deflector 42 are reversed from those shown in FIGS. 1 and 2.

The sides 44 and 46 are joined together by a base 48 which is arcuate in the transverse plane to define the generally U-shaped cross section of the deflector 42. The base 48 defines a deflector longitudinal axis 50 which is generally straight. The base 48 extends between longitudinally spaced-apart, open forward and aft opposite ends 52 and 54, respectively, of the deflector 42. Since the deflector is generally U-shaped, each of the forward and aft ends 52 and 54 is also U-shaped. The deflector 42 also includes a plurality of longitudinally spaced, generally U-shaped, arcuate stiffening ribs 56 extending circumferentially along inner surfaces of the first and second sides 44 and 46 and the base 48. The ribs 56 allow the deflector 42 to be relatively lightweight while providing structural rigidity for accommodating aerodynamic and actuation loads during operation.

The deflector first and second sides 44, 46 each includes an intermediate end 58 disposed between the forward and aft ends 52 and 54 at a maximum distance from the base 48. The deflector 42 is positionable in the stowed position 42a around exhaust nozzle 32 so that the first and second sides 44 and 46 extend adjacent to the wing outer surface 38 so that the intermediate ends 58 are positioned closely adjacent thereto and the aft end 54 is aligned generally with the nozzle outlet 30 for allowing substantially unobstructed discharge of the exhaust gases 34 from the nozzle outlet 30.

The reverser assembly 40 also includes a pair of bellcranks 60 each positioned adjacent to a respective one of the first and second deflector sides 44 and 46. Each bellcrank 60 includes a distal end 62 pivotally joined to a respective deflector side adjacent to the aft end 54, and, for example, is attached to one of the support ribs 56. The bellcrank 60 also includes a proximal end 64 pivotally supported adjacent to the wing surface 38 and an intermediate end 66 disposed between the distal and proximal ends 62 and 64. The bellcrank proximal end 64 may be conventionally fixedly connected to either the wing 14 or the exhaust nozzle 32, for example. As illustrated more particularly in FIG. 2, the proximal end 64 is pivotally connected to a support plate 68 which is fixedly connected to the wing 14 as described further hereinbelow.

The reverser assembly 40 further includes means 70 for rotating each of the bellcranks 60 about their proximal ends 64 from a bellcrank first position designated 60a wherein the deflector 42 is in the stowed position 42a, to a second position designated 60b wherein the deflector 42 is in the deployed position 42b.

Positioning means 72 are also provided for controlling the angular orientation of the deflector 42 as the deflector 42 is positioned from the stowed position 42a to the deployed position 42b. The bellcranks 60 and the positioning means 72 are effective for positioning the deflector 42 from the stowed position 42a to the deployed position 42b wherein the aft end 54 is disposed against the wing surface 38 and the base 48 extends outwardly from the wing surface 54 for deflecting the exhaust gases 34 upwardly and out from the forward end 52 for obtaining thrust reversal.

In the preferred embodiment, the deflector aft end 54 is inclined slightly relative to the nozzle outlet 30 to form what appears in FIG. 3 to be a fishmouth relative to the nozzle outlet 30. Although the radially outer portion of the deflector aft end 54 extends slightly aft of the nozzle outlet 30 in the deflector stowed position 42a, exhaust flow from the nozzle outlet 30 is not obstructed. The aft end 54 is so inclined to ensure that it may be positioned fully against the wing outer surface 38 for inclining forwardly the deflector 42 in its deployed position 42b for obtaining effective exhaust flow reversal.

Figure 5:
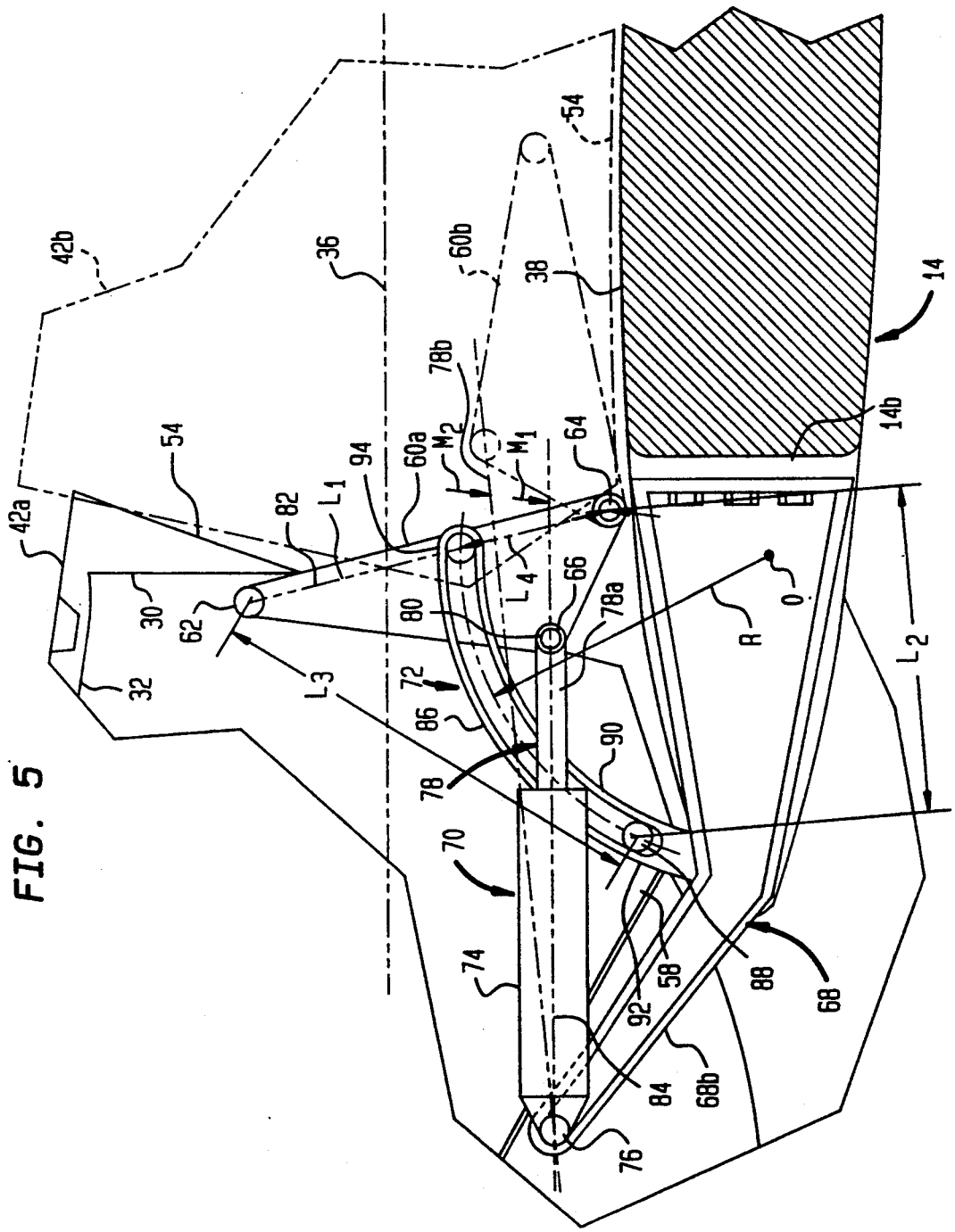
FIG. 5 is an enlarged sectional view of the actuator and linkage components of the thrust reverser assembly illustrated in FIG. 3.

As illustrated in FIGS. 4 and 5, the rotating means 70 include a pair of conventional linear actuators 74 each positioned adjacent to a respective one of the bellcranks 60, and adjacent to a respective first and second deflector side 44 and 46, with each actuator 74 including a support end 76 conventionally pivotally joined to an arm 68b of the support plate 68, for example. Each actuator 74 includes an extendable rod 78 having a conventional rod end 80 pivotally joined to a respective bellcrank intermediate end 66. The rod 78 is disposed in a retracted position designated 78a when the deflector 42 is in the stowed position 42a, and in an extended position 78b when the deflector 42 is in the deployed position 42b, as shown schematically in FIG. 5. Of course, in other embodiments of the present invention, the actuator 74 could be positioned differently so that its retracted position 78a is associated with the deflector deployed position 42b, and its extended position 78b is associated with the deflector stowed position 42a.

In a preferred embodiment, the distal, proximal and intermediate ends 62, 64, and 66 of each of the bellcranks 60 are arranged in a triangle and the bellcrank distal and proximal ends 62 and 64 define therebetween a bellcrank longitudinal axis 82. The bellcrank longitudinal axis 82 is preferably disposed generally perpendicularly to the wing surface 38 in the bellcrank first position 60a, and generally parallel to the wing surface 38 in the bellcrank second position 60b. One advantage of this arrangement, described in more detail hereinbelow, is to allow a relatively large translation aft of the deflector 42 upon rotation of the bellcranks 60 from the first to second positions 60a and 60b, with the bellcranks 60 disposed closely adjacent to the wing surface 38 in the second position 60b.

Each of the actuators 74 has a longitudinal centerline axis 84 and the actuator rod 78 is preferably positioned generally parallel to the nozzle centerline axis 36, as well as the wing surface 38, during both the deflector stowed position 42a and deployed position 42b. The bellcrank intermediate end 66 is preferably positioned between the actuator 74 and the bellcrank longitudinal axis 82 and the actuator centerline axis 84 is spaced outwardly from the bellcrank proximal end 64 to define a first moment arm designated $M_1$ when the actuator rod 78 is in the retracted position 78a and the bellcrank 60 is in its first position 60a. The actuator centerline axis 84 is also spaced outwardly from the bellcrank proximal end 64 to define a second moment arm designated $M_2$ when the actuator rod 78 is in its extended position 78b and the bellcrank 60 is in its second position 60b, with the second moment arm $M_2$ being greater than the first moment arm $M_1$.

The above arrangement of the actuator 74 and the bellcrank 60 allows the actuator 74 to be mounted adjacent to the exhaust nozzle 32 and above the wing surface 38 for providing improved serviceability as well as for providing force and motion amplification and relatively large travel of the bellcrank 60.

More specifically, in the deflector stowed position 42a, relatively little actuation torque is required to rotate and deploy the deflector 42, and therefore the first moment arm $M_1$ can be preferably sized relatively small. However, when the deflector 42 is disposed in the deployed position 42b, relatively large actuation torque is required to accommodate pressure forces from the airflow 26 flowing at relatively high velocity over the nacelle 18 and against the deflector 42 as it is deployed during landing, and from the exhaust gases 34. Accordingly, the second moment arm $M_2$ is preferably larger than the first moment arm $M_1$ to increase mechanical advantage to effectively amplify the force from the actuator 74. This allows for more torque being transmitted through the bellcrank 60 for accommodating these forces, and for relatively easily retracting the deflector 42 from the deployed position 42b to the stowed position 42a.

Furthermore, by initially positioning the bellcrank 60 generally perpendicular to the wing surface 38 and the nozzle centerline 36 (i.e. position 60a), and positioning the actuator 74 generally parallel to the nozzle centerline axis 36, the actuator centerline axis 84 is disposed generally perpendicular to the bellcrank longitudinal axis 82. And by further providing the bellcrank intermediate end 66 relatively close to the proximal end 64 with the relatively small first moment arm $M_1$, relatively little extension of the actuator output rod 78 is required for obtaining relatively large rotational movement of the bellcrank 60 from its first position 60a to its second position 60b. In the exemplary embodiment illustrated, the bellcrank 60 moves from its first position 60a of about 115° relative to the nozzle centerline axis 36 to its second position 60b of about 10° relative thereto for a total travel of about 105° with relatively small extension of the actuator rod 78.

Also in this regard, as shown in FIG. 5, the nozzle centerline axis 36 is spaced outwardly from the wing surface 38 and the bellcrank distal ends 62 are spaced outwardly from the wing outer surface 38 past the nozzle centerline axis 36. By this arrangement, the bellcrank 60 can be made relatively long from its pivot point, or proximal end 64, with its distal end 62 positioned above the nozzle centerline axis 36 adjacent to the deflector aft end 54. This allows for relatively large translation aft of the deflector 42 to ensure that little or no back pressure is generated in the exhaust gases 34 when the deflector 42 is disposed in its deployed position 42b.

Although the bellcranks 60 are effective for translating aft the deflector 42, the positioning means 72 are also required for controlling the angular orientation of the deflector 42 as the deflector 42 is positioned from the stowed position 42a to the deployed position 42b. More specifically, in the exemplary, preferred embodiment illustrated in FIG. 5, the positioning means 72 includes a pair of elongate tracks 86 each fixedly positioned adjacent to a respective one of the bellcranks 60. A pair of conventional rollers 88 is provided, with each being pivotally connected to a respective one of the deflector side intermediate ends 58 and slidably positioned in a respective one of the tracks 86. As additionally shown in FIGS. 2 and 6, the tracks 86 are fixedly connected to, or may be integral with, the support plate 68 for attaching the tracks 86 to the wing 14 as described further hereinbelow. Alternatively, the tracks 86 could also be mounted to the exhaust nozzle 32 or other structure for providing a fixed support.

In the preferred embodiment, each of the tracks 86 is arcuate and has a radius R having an origin O disposed below the wing surface 38. Such arcuate tracks 86 are preferred for disposing the positioning means 72 above the wing surface 38 for improved serviceability, and avoiding any linkage extending into the wing 14 which would otherwise be required for obtaining the desired orientation of the deflector 42. Each of the tracks 86 is preferably U-shaped and includes two parallel, or concentric, legs 90 between which is disposed a respective roller 88 which is rollable therebetween.

The tracks 86 include a forward end 92 and an aft end 94 and each of the rollers 88 is disposed at the track forward end 92 when the deflector 42 is in the stowed position 42a, and at the aft end 94 when the deflector 42 is disposed in the deployed position 42b. The arcuate configuration of the track 86 allows the deflector 42 to translate aft upon rotation of the bellcranks 60 from the first to second bellcrank positions 60a and 60b, and causes deflector 42 to rotate so that the deflector 42 surrounds the exhaust nozzle 32 in the stowed position 42a and the deflector aft end 54 is positioned against the wing surface 38 in the deflector deployed position 42b.

As illustrated in FIG. 5, and in FIG. 6, which shows a perspective view of one of the plates 68 itself, the track 86 and the support arm 68b are integral parts of the support plate 68. The plate 68 also includes an integral bushing 68c for conventionally supporting the bellcrank proximate end 64. The plate 68 is fixedly attached to a conventional wing spar 14b, by bolts for example, and extends in an upstream direction for mounting the actuator 74 in the above-described preferred position. The plate 68 is preferably attached to the spar 14b and disposed within the outline of the wing 14 in the vicinity of the pylon 12, and the support arm 68b, track 86, and bushing 68c extend outwardly from the wing outer surface 38 for allowing improved serviceability of the assembly 40, while providing a rigid support for the deflector 42 independent of the engine 10.

As illustrated in FIGS. 3 and 4, when the deflector 42 is in its stowed position 42a, it is aligned generally with the nacelle 18 for providing a relatively aerodynamically smooth outer contour, with the deflector forward end 52 butting against the nacelle 18.

As illustrated in FIG. 3, the deflector longitudinal axis 50 is inclined at a first inclination angle $B_1$ relative to the nozzle centerline axis 36 in the deflector stowed position 42a. In the deflector deployed position 42b, the deflector longitudinal axis 50 is positioned at a second inclination angle $B_2$ relative to the nozzle centerline axis 36, with the second inclination angle $B_2$ being substantially greater than the first inclination angle $B_1$. In the deflector stowed position 42a, the deflector base 48 is generally parallel to the nozzle centerline axis 36 and in the deflector deployed position 42b, the deflector base 48 is disposed generally perpendicularly to the nozzle centerline axis 36 and the wing outer surface 38. Thusly, the deflector 42 has a substantial angular travel with the first inclination angle being about 15° and the second inclination angle being about 80° for placing the deflector 42 in the deployed position 42b for providing thrust reversal.

As illustrated in FIG. 5, the bellcrank distal end 62 and the roller 88 are spaced relatively far from each other in the preferred embodiment for providing stable support of the deflector 42 against the airflow 26 over the nacelle 18 and the exhaust gases 34 when the deflector 42 is deployed from its stowed position 42a to its deployed position 42b. Since the deflector 42 is supported solely at four points, in particular at two points on each side, i.e. 62 and 88, it is preferred to spread those two points apart as far as practical. However, the spacing between the roller 88 and the bellcrank proximal end 64 changes during deflector deployment, and, therefore, that spacing also affects stability.

The bellcrank longitudinal axis 82 between the distal and proximal ends 62 and 64 has a first length $L_1$, and the roller 88 is spaced from the bellcrank proximal end 64 at a second length $L_2$ when the deflector 42 is in the stowed position 42a. The roller 88 is also spaced from the bellcrank distal end 62 at a third length $L_3$. In the preferred embodiment, the first, second, and third lengths $L_1$, $L_2$, and $L_3$ are generally equal for providing a stable support for the deflector 42 during deployment.

The roller 88 is also spaced from the bellcrank proximal end 64 at a fourth length $L_4$ when the deflector 42 is in its deployed position 42b, with the fourth length $L_4$ being substantially less than the second length $L_2$. In the preferred embodiment, $L_4$ is less than about half of the first length $L_1$ for also providing stable support while allowing the relatively large translation aft of the deflector 42 upon rotation of the bellcranks 60, and for controlling the angular orientation of the deflector 42. The relationship of the track 86 relative to the bellcrank 60 allows for these preferred lengths of $L_2$, $L_3$, and $L_4$ relative to each other and $L_1$ for obtaining the advantages of stable support and the preferred angular orientation of the deflector 42.

Although in the preferred embodiment, the track 86 is arcuate, in other embodiments of the present invention, the track 86 could be straight or other configurations as desired for controlling the angular orientation of the deflector 42. Furthermore, means other than the track 86 may be used in alternate embodiments of the invention for controlling the angular orientation of the deflector 42 during its deployment.

Accordingly, the relatively large bellcrank length $L_1$, which is also the radius of rotation of the bellcrank 60 about its proximal end 64, allows for relatively large translation aft of the deflector 42. The preferred values of the lengths $L_2$, $L_3$ and $L_4$ relative to each other and $L_1$ as described above provide for stable deployment of the deflector 42. The preferred orientation of the bellcrank intermediate end 66 and actuator 74 for obtaining the moment arms $M_1$ and $M_2$ provides for motion and force amplification with relatively short stroke of the actuator rod 78. And, these preferred configurations provide a relatively compact thrust reverser assembly 40 adjacent to the exhaust nozzle 32 for improved serviceability.

Since the reverser assembly 40 is symmetrical on both sides of the deflector 42, the operation of the respective actuators 74, bellcranks 60 and tracks 86 are substantially self-synchronizing. The actuators 74 are conventionally powered, or actuated in unison for deploying and retracting the deflector 42. In alternate embodiments, however, conventional means could be used for ensuring that the bellcranks 60 are rotated more accurately in synchronization.

In the preferred embodiment, small fairings 96 as shown in FIG. 2 may be conventionally attached to the wing 14 and extend outwardly therefrom adjacent to the deflector sides 44 and 46 to cover the bellcranks 60 and attached components. The fairings 96 are preferably blended with the deflector 42 and the nacelle 18 for providing an aerodynamically smooth outer contour.

A significant feature of the preferred embodiment of the above-described invention is the ability to locate the entire actuation assembly of the deflector 42, i.e. bellcranks 60, rotating means 70, and positioning means 72, external to the wing 14 for improved serviceability, and for eliminating any interference with the wing structure itself, including ribs, spars and fuel tanks therein. Since the support plate 68 extends upstream from the leading edge spar 14b at the pylon 12, the wing 14 is not otherwise affected by the assembly 40.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. For a gas turbine engine exhaust nozzle having an axial centerline axis and supported by a wing for discharging exhaust gases from an outlet thereof over a surface of said wing, a thrust reverser assembly comprising:

a generally U-shaped deflector having first and second spaced-apart sides joined together by a base, and spaced-apart open forward and aft ends, said deflector being positionable in a stowed position where said deflector is aligned generally with the nacelle of said engine to provide an aerodynamically smooth outer contour and around said exhaust nozzle so that said first and second sides extend adjacent to said wing surface and said aft end is aligned generally with said nozzle outlet for allowing substantially unobstructed discharge of said exhaust gases from said nozzle outlet, and in a deployed position for changing direction of said exhaust gases for thrust reversal;

a pair of bellcranks each positioned adjacent to a respective one of said first and second deflector sides, each bellcrank including a distal end pivotally joined to a respective deflector side adjacent to said aft end, a proximal end pivotally supported adjacent to said wing surface, and an intermediate end disposed between said distal and proximal ends;

means for rotating each of said bellcranks about said proximal end from a first position wherein said deflector is in said stowed position to a second position wherein said deflector is in said deployed position;

positioning means for controlling angular orientation of said deflector as said deflector is positioned from said stowed position to said deployed position; and wherein said bellcranks and positioning means are effective for positioning said deflector from said stowed position to said deployed position so that said aft end is disposed against said wing surface and said base extends outwardly from said wing surface for deflecting said exhaust gases upwardly and out from said forward end.

2. A thrust reverser assembly according to claim 1 wherein said rotating means comprises:

a pair of actuators each positioned adjacent a respective one of said bellcranks, each actuator including a support end pivotally joined adjacent to said exhaust nozzle and an extendable rod having a rod end pivotally joined to said bellcrank intermediate end; and said rod being in a retracted position when said deflector is in said stowed position and in an extended position when said deflector is in said deployed position.

3. For a gas turbine engine exhaust nozzle having an axial centerline axis and supported by a wing for discharging exhaust gases from an outlet thereof over a surface of said wing, a thrust reverser assembly comprising:

a generally U-shaped deflector having first and second spaced-apart sides joined together by a base, and spaced-apart open forward and aft ends, said deflector being positionable in a stowed position where said deflector is aligned generally with the nacelle of said engine to provide an aerodynamically smooth outer contour and around said exhaust nozzle so that said first and second sides extend adjacent to said wing surface and said aft end is aligned generally with said nozzle outlet for allowing substantially unobstructed discharge of said exhaust gases from said nozzle outlet, and in a deployed position for changing direction of said exhaust gases for thrust reversal;

a pair of bellcranks each positioned adjacent to a respective one of said first and second deflector sides, each bellcrank including a distal end pivotally joined to a respective deflector side adjacent to said aft end, a proximal end pivotally supported adjacent to said wing surface, and an intermediate end disposed between said distal and proximal ends;

means for rotating each of said bellcranks about said proximal end from a first position wherein said deflector is in said stowed position to a second position wherein said deflector is in said deployed position, said rotating means comprising:

a pair of actuators each positioned adjacent a respective one of said bellcranks, each actuator including a support end pivotally joined adjacent to said exhaust nozzle and an extendable rod having a rod end pivotally joined to said bellcrank intermediate end; and said rod being in a retracted position when said deflector is in said stowed position and in an extended position when said deflector is in said deployed position;

positioning means for controlling angular orientation of said deflector as said deflector is positioned from said stowed position to said deployed position; and wherein said bellcranks and positioning means are effective for positioning said deflector from said stowed position to said deployed position so that said aft end is disposed against said wing surface and said base extends outwardly from said wing surface for deflecting said exhaust gases upwardly and out from said forward end; and wherein said proximal, intermediate and distal ends of each of said bellcranks are arranged in a triangle and said bellcrank proximal and distal ends define a longitudinal axis therebetween, said bellcrank longitudinal axis being positioned generally perpendicularly to said wing surface in said bellcrank first position and generally parallel to said wing surface in said bellcrank second position;

said actuator includes a longitudinal centerline axis, and said actuator rod is positioned generally parallel to said nozzle centerline axis;

said bellcrank intermediate end is positioned between said actuator and said bellcrank longitudinal axis; and said actuator centerline axis is spaced from said bellcrank proximal end to define a first moment arm when said actuator is in said retracted position and said bellcrank is in said first position, and said actuator centerline axis is spaced from said bellcrank proximal end to define a second moment arm when said actuator is in said extended position and said bellcrank is in said second position, said second moment arm being greater than said first moment arm.

4. A thrust reverser assembly according to claim 3 wherein said nozzle centerline axis is spaced outwardly from said wing surface and said bellcrank distal ends are spaced outwardly from said wing surface past said nozzle centerline axis.

5. For a gas turbine engine exhaust nozzle having an axial centerline axis and supported by a wing for discharging exhaust gases from an outlet thereof over a surface of said wing, a thrust reverser assembly comprising:

a generally U-shaped deflector having first and second spaced-apart sides joined together by a base, and spaced apart open forward and aft ends, said deflector being positionable in a stowed position where said deflector is aligned generally with the nacelle of said engine to provide an aerodynamically smooth outer contour and around said exhaust nozzle so that said first and second sides extend adjacent to said wing surface and said aft end is aligned generally with said nozzle outlet for allowing substantially unobstructed discharge of said exhaust gases from said nozzle outlet, and in a deployed position for changing direction of said exhaust gases for thrust reversal;

a pair of bellcranks each positioned adjacent to a respective one of said first and second deflector sides, each bellcrank including a distal end pivotally joined to a respective deflector side adjacent to said aft end, a proximal end pivotally supported adjacent to said wing surface, and an intermediate end disposed between said distal and proximal ends;

means for rotating each of said bellcranks about said proximal end from a first position wherein said deflector is in said stowed position to a second position wherein said deflector is in said deployed position;

positioning means for controlling angular orientation of said deflector as said deflector is positioned from said stowed position to said deployed position, said positioning means comprising:

a pair of elongate tracks each fixedly positioned adjacent to a respective one of said bellcranks;

said deflector first and second sides each including an intermediate end disposed between said forward and aft ends and positioned adjacent to said wing surface in said deflector stowed position;

a pair of rollers, each pivotally connected to a respective one of said deflector side intermediate ends, and slidably positioned in a respective one of said tracks;

each of said rollers being disposed at a forward end of said track when said deflector is in said stowed position and at an aft end of said track when said deflector is in said deployed position, said track being configured for allowing said deflector to translate aft upon rotation of said bellcrank from said first to second positions, and for rotating said deflector so that said deflector surrounds said exhaust nozzle in said stowed position, and in said deflector deployed position said deflector aft end is positioned against said wing surface; and wherein said bellcranks and positioning means are effective for positioning said deflector from said stowed position to said deployed position so that said aft end is disposed against said wing surface and said base extends outwardly from said wing surface for deflecting said exhaust gases upwardly and out from said forward end.

6. A thrust reverser assembly according to claim 5 wherein said deflector base defines a deflector longitudinal axis and said deflector longitudinal axis is inclined at a first angle relative to said nozzle centerline axis in said deflector stowed position, and at a second angle relative thereto in said deflector deployed position, said second angle being greater than said first angle.

7. A thrust reverser assembly according to claim 6 wherein said deflector base is generally parallel to said nozzle centerline axis in said deflector stowed position and generally perpendicular thereto in said deployed position.

8. A thrust reverser assembly according to claim 7 wherein said deflector first angle is about 15° and said second angle is about 80°.

9. A thrust reverser assembly according to claim 5 wherein said bellcrank distal end and said roller are spaced relatively far from each other for providing stable support of said deflector against aerodynamical pressure forces when travelling to said deployed position.

10. A thrust reverser assembly according to claim 9 wherein said bellcrank distal and proximal ends define a longitudinal axis therebetween having a first length and said roller is spaced from said bellcrank proximal end at a second length when said deflector is in said stowed position, and said first and second lengths are generally equal.

11. A thrust reverser assembly according to claim 10 wherein said roller is spaced from said bellcrank distal end at a third length, and said first, second and third lengths are generally equal.

12. A thrust reverser assembly according to claim 11 wherein said roller is spaced from said bellcrank proximal end at a fourth length when said deflector is in said deployed position and said fourth length is less than said second length.

13. A thrust reverser assembly according to claim 12 wherein said fourth length is less than about half of said first length.

14. A thrust reverser assembly according to claim 5 wherein said track is arcuate.

15. A thrust reverser assembly according to claim 14 wherein said track has a radius having an origin below said wing surface.

16. A thrust reverser assembly according to claim 14 wherein said track is U-shaped and includes two parallel legs, and said roller is disposed between said legs and is slidable therebetween.

17. For a gas turbine engine exhaust nozzle having an axial centerline axis and supported by a wing for discharging exhaust gases from an outlet thereof over a surface of said wing, a thrust reverser assembly comprising:

a generally U-shaped deflector having first and second spaced-apart sides joined together by a base, and spaced-apart open forward and aft ends, said deflector being positionable in a stowed position where said deflector is aligned generally with the nacelle of said engine to provide an aerodynamically smooth outer contour and around said exhaust nozzle so that said first and second sides extend adjacent to said wing surface and said aft end is aligned generally with said nozzle outlet for allowing substantially unobstructed discharge of said exhaust gases from said nozzle outlet, and in a deployed position for changing direction of said exhaust gases for thrust reversal;

a pair of bellcranks each positioned adjacent to a respective one of said first and second deflector sides, each bellcrank including a distal end pivotally joined to a respective deflector side adjacent to said aft end, a proximal end pivotally supported adjacent to said wing surface, and an intermediate end disposed between said distal and proximal ends;

means for rotating each of said bellcranks about said proximal end from a first position wherein said deflector is in said stowed position to a second position wherein said deflector is in said deployed position, said rotating means comprising:

a pair of actuators each positioned adjacent a respective one of said bellcranks, each actuator including a support end pivotally joined adjacent to said exhaust nozzle and an extendable rod having a rod end pivotally joined to said bellcrank intermediate end; and said rod being in a retracted position when said deflector is in said stowed position and in an extended position when said deflector is in said deployed position; and positioning means for controlling angular orientation of said deflector as said deflector is positioned from said stowed position to said deployed position, said positioning means comprising:

a pair of elongate tracks each fixedly positioned adjacent to a respective one of said bellcranks;

said deflector first and second sides each including an intermediate end disposed between said forward and aft ends and positioned adjacent to said wing surface in said deflector stowed position;

a pair of rollers, each pivotally connected to a respective one of said deflector side intermediate ends, and slidably positioned in a respective one of said tracks;

each of said rollers being disposed at a forward end of said track when said deflector is in said stowed position and at an aft end of said track when said deflector is in said deployed position, said track being configured for allowing said deflector to translate aft upon rotation of said bellcrank from said first to second positions, and for rotating said deflector so that said deflector surrounds said exhaust nozzle in said stowed position, and in said deflector deployed position said deflector aft end is positioned against said wing surface; and wherein said bellcranks and positioning means are effective for positioning said deflector from said stowed position to said deployed position so that said aft end is disposed against said wing surface and said base extends outwardly from said wing surface for deflecting said exhaust gases upwardly and out from said forward end.

18. A thrust reverser assembly according to claim 17 wherein:

said proximal, intermediate and distal ends of each of said bellcranks are arranged in a triangle and said bellcrank proximal and distal ends define a longitudinal axis therebetween, said bellcrank longitudinal axis being positioned generally perpendicularly to said wing surface in said bellcrank first position and generally parallel to said wing surface in said bellcrank second position;

said actuator includes a longitudinal centerline axis, and said actuator rod is positioned generally parallel to said nozzle centerline axis;

said bellcrank intermediate end is positioned between said actuator and said bellcrank longitudinal axis; and said actuator centerline axis is spaced from said bellcrank proximal end to define a first moment arm when said actuator is in said retracted position and said bellcrank is in said first position, and said actuator centerline axis is spaced from said bellcrank proximal end to define a second moment arm when said actuator is in said extended position and said bellcrank is in said second position, said second moment arm being greater than said first moment arm.

19. A thrust reverser assembly according to claim 18 wherein said nozzle centerline axis is spaced outwardly from said wing surface and said bellcrank distal ends are spaced outwardly from said wing surface past said nozzle centerline axis.

20. A thrust reverser assembly according to claim 19 wherein said deflector base defines a deflector longitudinal axis and said deflector longitudinal axis is inclined at a first angle relative to said nozzle centerline axis in said deflector stowed position, and at a second angle relative thereto in said deflector deployed position, said second angle being greater than said first angle.

21. A thrust reverser assembly according to claim 20 wherein said deflector base is generally parallel to said nozzle centerline axis in said deflector stowed position and generally perpendicular thereto in said deployed position.

22. A thrust reverser assembly according to claim 21 wherein said bellcrank distal and proximal ends define a longitudinal axis therebetween having a first length and said roller is spaced from said bellcrank proximal end at a second length when said deflector is in said stowed position, and said first and second lengths are generally equal.

23. A thrust reverser assembly according to claim 22 wherein said roller is spaced from said bellcrank distal end at a third length, and said first, second and third lengths are generally equal.

24. A thrust reverser assembly according to claim 23 wherein said track is arcuate and has a radius having an origin below said wing surface.

25. A thrust reverser assembly according to claim 17 wherein said rotating means and said positioning means are disposed external of said wing.

* * * * *